US008738823B2

(12) United States Patent
Brown et al.

(10) Patent No.: US 8,738,823 B2
(45) Date of Patent: May 27, 2014

(54) QUIESCING INPUT/OUTPUT (I/O) REQUESTS TO SUBSETS OF LOGICAL ADDRESSES IN A STORAGE FOR A REQUESTED OPERATION (71) Applicant: International Business Machines Corporation, Armonk, NY (US)

(72) Inventors: Theresa M. Brown, Tucson, AZ (US); Nedlaya Y. Francisco, Tucson, AZ (US); Kurt A. Lovrien, Tucson, AZ (US); Carol S. Mellgren, Tucson, AZ (US); Jared M. Minch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/653,353

(22) Filed: Oct. 16, 2012

(65) Prior Publication Data
US 2014/0108680 A1 Apr. 17, 2014

(51) Int. Cl.
*G06F 13/10* (2006.01)
(52) U.S. Cl.
USPC ............................................. 710/36; 710/18
(58) Field of Classification Search
None
See application file for complete search history.

(56) References Cited

U.S. PATENT DOCUMENTS

| 6,161,191 | A  | * | 12/2000 | Slaughter et al. | 714/4.1 |
| 6,345,368 | B1 | * | 2/2002  | Bergsten | 714/11 |
| 6,446,219 | B2 | * | 9/2002  | Slaughter et al. | 714/4.2 |
| 6,738,870 | B2 | * | 5/2004  | Van Huben et al. | 711/150 |
| 6,816,945 | B2 | * | 11/2004 | Harris et al. | 711/135 |
| 7,421,714 | B1 | * | 9/2008  | Orling et al. | 719/328 |
| 7,721,057 | B2 | * | 5/2010  | Berkowitz et al. | 711/162 |
| 7,730,267 | B2 | * | 6/2010  | Pepper | 711/152 |
| 8,234,642 | B2 | * | 7/2012  | Slegel et al. | 718/100 |
| 8,307,173 | B2 | * | 11/2012 | McKenney | 711/156 |
| 8,407,701 | B2 | * | 3/2013  | Gaertner et al. | 718/1 |
| 2006/0085488 | A1 | * | 4/2006 | Kitsuregawa et al. | 707/200 |
| 2007/0088928 | A1 |   | 4/2007  | Thangaraj et al. | |
| 2010/0268904 | A1 |   | 10/2010 | Sheffield et al. | |
| 2011/0321048 | A1 | * | 12/2011 | Gaertner et al. | 718/102 |
| 2012/0102286 | A1 | * | 4/2012  | Holt et al. | 711/165 |
| 2013/0080704 | A1 | * | 3/2013  | Brown et al. | 711/118 |

\* cited by examiner

*Primary Examiner* — Cheng-Yuan Tseng
(74) *Attorney, Agent, or Firm* — Konrad Raynes Davda & Victor LLP; David W. Victor (57) ABSTRACT

Provided are a computer program product, system, and method for quiescing Input/Output (I/O) requests to subsets of logical addresses in a storage for a requested operation. A requested operation is received to a subset of addresses in the storage that requires that Input/Output (I/O) requests to the subset of addresses received following the requested operation be quiesced. The subset of addresses is indicated in quiesce information. I/O requests received following the receiving of the requested operation are quiesced when one address subject to the I/O request is included in the subset of addresses. If there are in-progress I/O requests pending against the subset of addresses when the requested operation was received, then the requested operation is indicated as executable. A quiesced I/O request is executed when no address subject to the quiesced I/O request is included in the subset of addresses indicated in the quiesce information.

25 Claims, 7 Drawing Sheets

FIG. 1

Storage (Logical Volume) Quiesce Information

FIG. 2

Operation Information Instance

QUIESCING INPUT/OUTPUT (I/O) REQUESTS TO SUBSETS OF LOGICAL ADDRESSES IN A STORAGE FOR A REQUESTED OPERATION

BACKGROUND OF THE INVENTION

1. Field of the Invention

The present invention relates to a computer program product, system, and method for quiescing Input/Output (I/O) requests to subsets of logical addresses in a storage for a requested operation.

2. Description of the Related Art

Certain operations performed in a storage controller require that no other Input/Output (I/O) requests access and modify logical blocks subject to the operation while the operation is ongoing. One method to ensure that I/O requests do not modify logical blocks subject to the operation is to stop all I/O requests to the entire volume or device.

Another method is to have the host that submitted the operation not to issue commands that would modify the logical blocks subject to the operation while the operation is in progress. This requires host software that supports stopping all I/O requests. In a multi-host environment, the hosts must communicate and coordinate to stop I/O requests to the volume subject to the operation.

SUMMARY

Provided are a computer program product, system, and method for quiescing Input/Output (I/O) requests to subsets of logical addresses in a storage for a requested operation. A requested operation is received to a subset of addresses in the storage that requires that Input/Output (I/O) requests to the subset of addresses received following the requested operation be quiesced. The subset of addresses is indicated in quiesce information. I/O requests received following the receiving of the requested operation are quiesced when one address subject to the I/O request is included in the subset of addresses. A determination is made as to whether there are in-progress I/O requests pending against the subset of addresses when the requested operation was received. The requested operation is indicated as executable in response to determining that there are no in-progress I/O requests against the subset of addresses. One of the quiesced I/O requests is executed in response to determining that no address subject to the quiesced I/O request is included in the subset of addresses indicated in the quiesce information.

DETAILED DESCRIPTION

Described embodiments provide techniques for quiescing I/O requests to a subset of addresses of a storage or logical volume for an operation to prevent other I/O requests from modifying the subset while the operation is ongoing. However, I/O requests may continue to access addresses in the volume not included in the subset being quiesced by the operation. Further, the operation may not commence until I/O requests pending when the operation began complete. In certain embodiments, the management of these operations for the volumes is maintained in the storage controller so that host software is not needed for coordination among attached hosts and I/O requests to addresses not subject to quiescing by one or more operations may continue.

Figure 1:
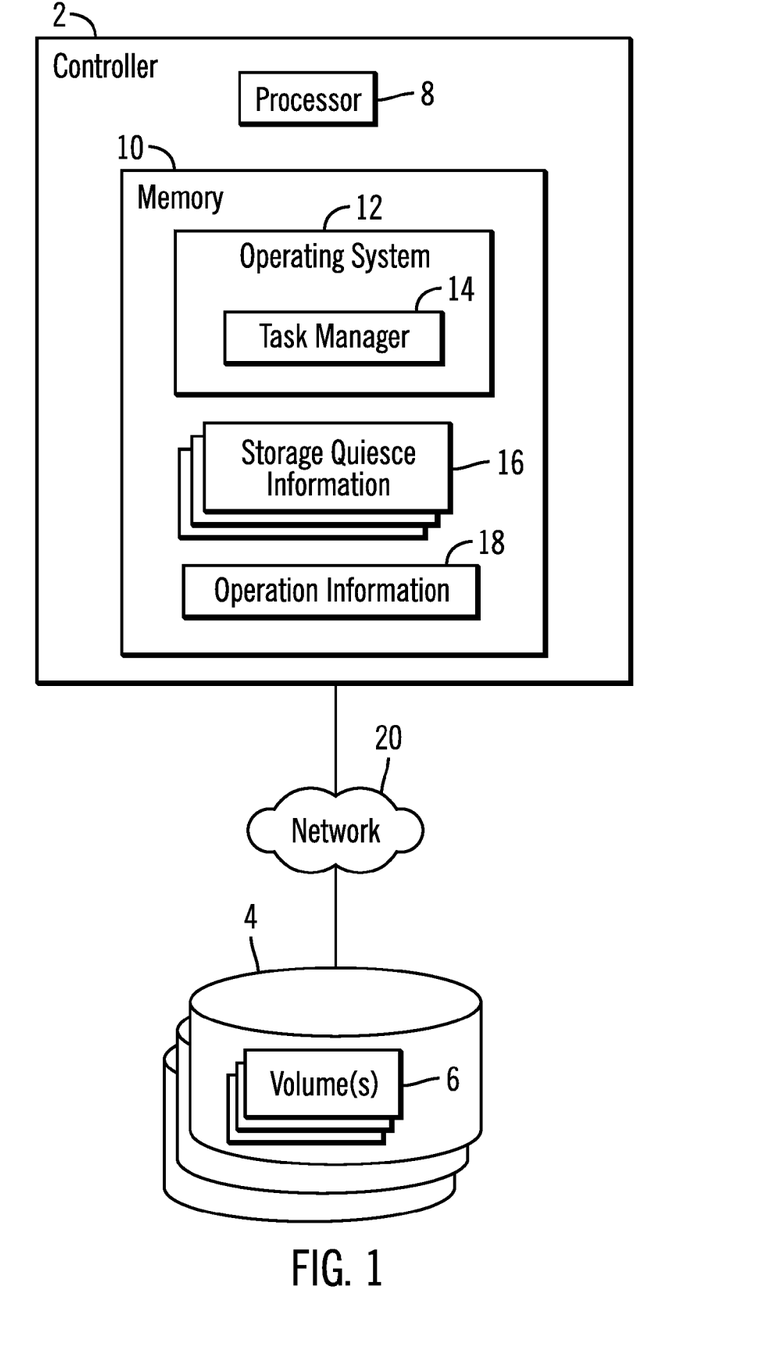
FIG. 1 illustrates an embodiment of a computing environment.

FIG. 1 illustrates an embodiment of a computing environment having a controller 2 to process Input/Output requests from hosts (not shown) to one or more coupled storages 4, each having one or more volumes 6. The logical volumes 6 may be configured in a fixed block address (FBA) format having logical addresses, such as logical block addresses (LBAs), configured in physical locations in the storages 4. The controller 2 includes a processor 8 and memory 10. The controller 2 may communicate with the storages 4 over a network 20 or, in a further embodiment, over a direct connection.

The memory 10 includes an operating system 12 to process I/O requests from hosts directed to volumes 6 in the storages 4 and a task manager 14 to manage the execution of an operation. The task manager 12 maintains storage quiesce information 16 having an instance of such storage quiesce information for each volume 6 in the storages 4. The task manager 14 further maintains operation information 16 on the pending operations being executed at the controller 2.

The operations processed by the task manager 14 may comprise an operation submitted by a host and directed to a subset of addresses in one or more of the volumes 6 that require the quiescing of any I/O requests to the subset of addresses received after the operation was received until the operation was completed. One example of such an operation may comprise a point-in-time ("PiT") copy establish operation to create the relationship information and data structures for a PiT copy relationship between a source and target volumes. A subset of addresses in a volume 6 may comprise all or less than all of the addresses in the volume 6.

A PiT copy relationship, created during a PiT copy establish command, includes source relationship information and target relationship information both providing information on the source and target subsets of addresses involved in the PiT copy operation. This information is used to manage I/O requests to the source and target volumes to determine if the I/O requests are to addresses involved in a PiT copy operation. The PiT copy relationship may further include a copy map indicating tracks in a target volume to which source logical addresses in the source set need to be copied.

One non-limiting example of a PiT copy operation is a snapshot copy operation, such as IBM FlashCopy® (Flash-Copy is a registered trademark of International Business Machines, Corp. or "IBM"). The operations requiring quiescing of subset of addresses to which the operation is directed may comprise operations in addition to PiT copy establish operations.

In one embodiment, operations submitted by the hosts may be intended for a Fixed Block Address (FBA) storage architecture where the data to be copied is stored in volumes 6 implementing a track based data storage architecture, such as Count Key Data (CKD), where data records can be variable in length and where the tracks are expressed as a cylinder and head (CCHH) track location in the volume. The controller 2 includes the capability to map LBAs to tracks in the storages 4.

The task manager 14 is shown in FIG. 1 as program code that is part of the operating system 12 loaded into the memory 10 and executed by the processor 8. Alternatively, some or all of the functions of the task manager 14 may be implemented in hardware devices in the controller 2, such as in Application Specific Integrated Circuits (ASICs), Field Programmable Gate Array (FPGA), etc. The controller 2 may include other programs not shown, such as an operating system and application programs.

The controller 2 may comprise a storage controller, server or other device suitable for managing I/O requests to the storage 4. In alternative embodiments, the controller 2 may comprise any other type of computing device, such as a personal computer, smartphone, laptop, tablet, mainframe, etc.

The memory 10 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storages 4 may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storages 4 may store tracks in a Redundant Array of Independent Disks (RAID) configuration where strides of tracks are written across multiple storage devices comprising the storages 4a, 4b. ranks.

The network 20 may comprise a network such as a Local Area Network (LAN), Storage Area Network (SAN), Wide Area Network (WAN), peer-to-peer network, wireless network, etc.

Figure 2:
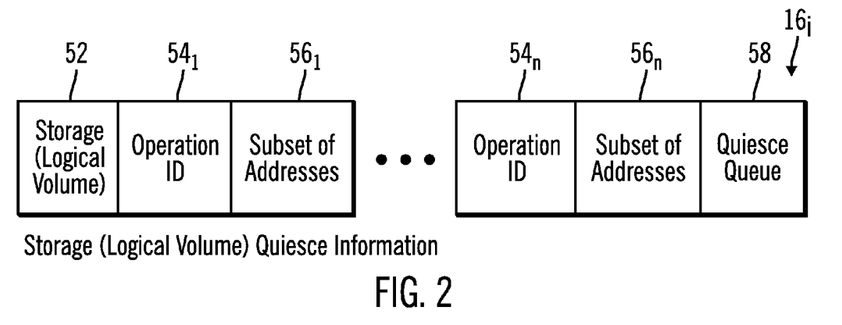
FIG. 2 illustrates an embodiment of storage quiesce information.

FIG. 2 illustrates an embodiment of an instance of storage quiesce information $16_i$ for logical volume i, including: a storage or logical volume identifier (ID) 50, and one or more instances of operation IDs $54_1 \ldots 54_n$ and corresponding subset of addresses $56_1 \ldots 56_n$ for which I/O requests are quiesced for the corresponding operations $54_1 \ldots 54_n$; and a quiesce queue 58 for the storage or logical volume 52. Each subset of addresses $56_1 \ldots 56_n$ may comprise consecutive and/or non-consecutive addresses. The subset of operation IDs $54_1 \ldots 54_n$ may be all different operation IDs or have some duplicate operation IDs if one operation requires quiescing with respect to multiple subsets of addresses in the volume $6_i$ for which the quiesce information $16_i$ is maintained. When receiving an operation requiring quiescing directed to a subset of addresses in one or more volumes 16, the operation ID $54_n$ and subset of addresses $56_n$ for that nth operation would be added to the storage quiesce information 16i for each volume $6_i$ having a subset of addresses targeted by the operation.

Figure 3:
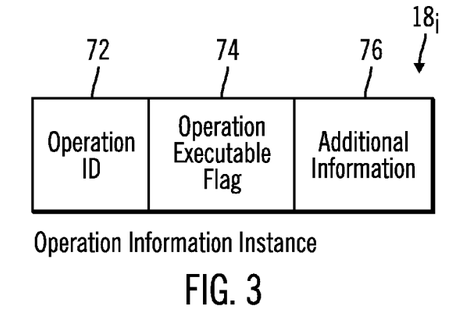
FIG. 3 illustrates an embodiment of an operation information instance.

FIG. 3 illustrates an embodiment of an instance of operation information 18i for operation i. The operation information instance $18_i$ indicates an operation ID 72, an operation executable flag 74 indicating whether the operation is eligible for execution or is pending, and additional information 76 used in managing the operation 72, such as the subset of addresses in storage to which the operation is directed, an identification of the type of operation, indication whether the operation requires quiescing of I/O requests to addresses in a volume, etc.

Figure 4:
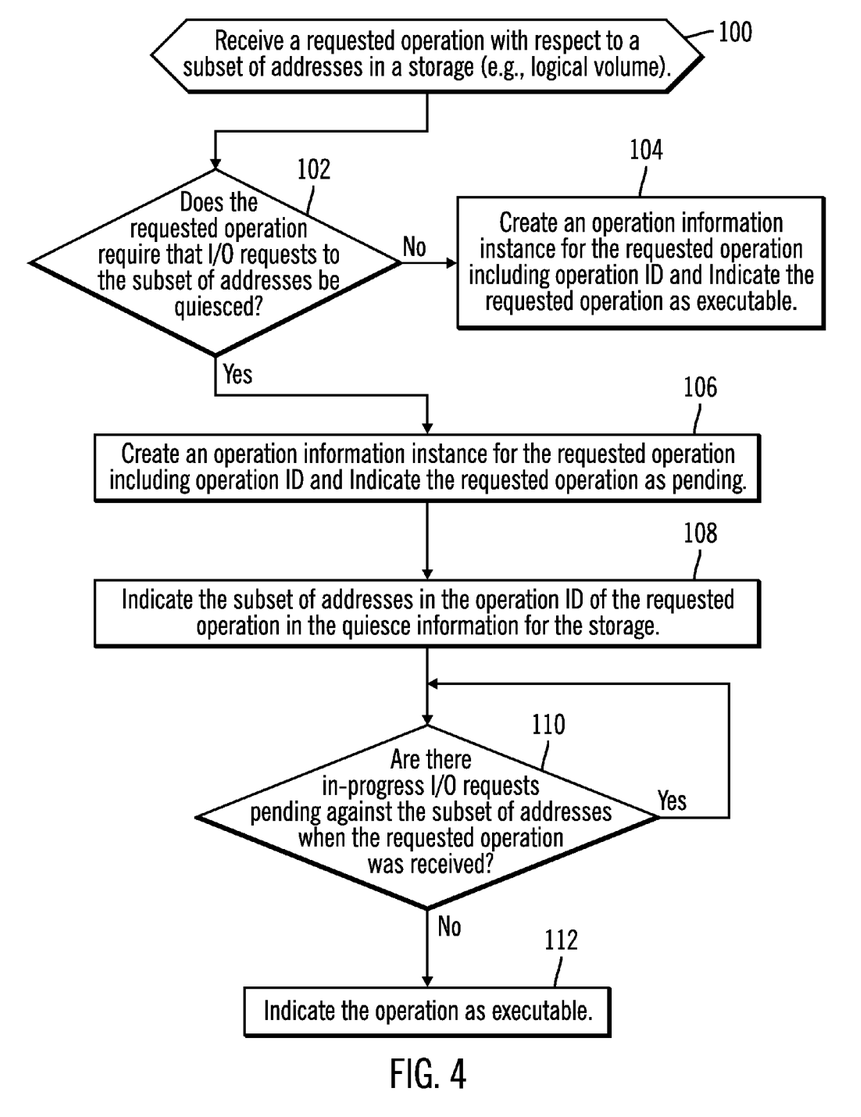
FIG. 4 illustrates an embodiment of operations to process a requested operation.

FIG. 4 illustrates an embodiment of operations performed by the task manager 14 to process a requested operation that involves a subset of addresses in a volume 6 in one of the storages 4. If (at block 102) the requested operation does not require that I/O requests to the subset of addresses be quiesced, then the task manager 14 creates (at block 104) an operation information instance $18_i$ for the requested operation in the operation information 18, including operation ID 72 for the requested operation and indicates in field 74 that the operation is executable. Otherwise, if I/O requests must be quiesced, then the task manager 14 creates (at block 106) an operation information instance $18_i$ for the requested operation including the operation ID 72 and indicates the requested operation as pending in field 74. The task manager 14 indicates (at block 108) the requested operation identifier (ID) 74 and the subset of addresses in fields $54_n$ and $56_n$ (FIG. 2), respectively, in the quiesce information $16_i$ for the volume $6_i$ having the subset of addresses to quiesce.

If (at block 110) there are in-progress I/O requests pending against the subset of addresses $56_n$ when the requested operation was received, then control proceeds back to block 110 to continually perform the operation of block 110 until there are no more pending in-progress I/O request against the subset of address for the operation. If (from the no branch of block 112) there are no pending in-progress I/O requests, then the task manager 14 indicates (at block 112) the requested operation as executable, such as by updating the operation information instance $18_i$ for the requested operation to indicate executable in the operation executable flag 74 (FIG. 3).

Figure 5:
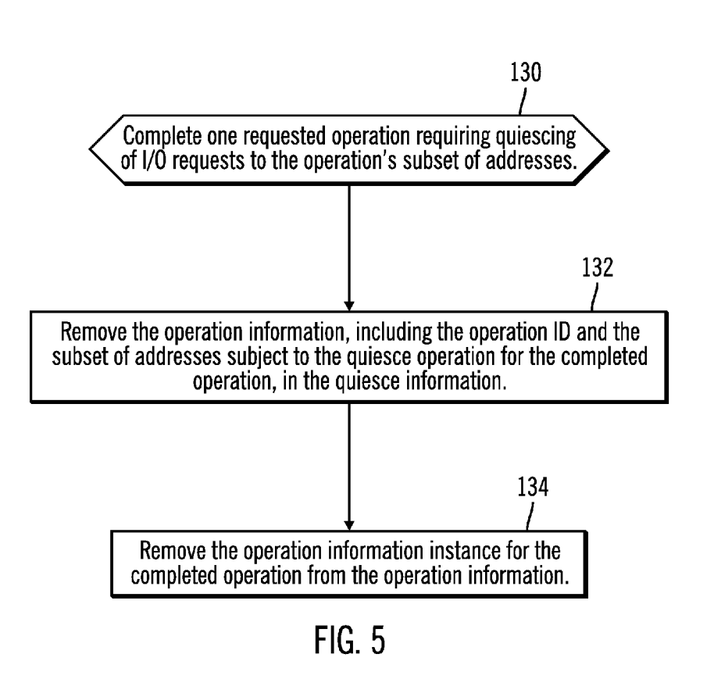
FIG. 5 illustrates an embodiment of operations to process a completed requested operation.

FIG. 5 illustrates an embodiment of operations to process a complete of one of the requested operations indicated in the operation information 18. Upon processing (at block 130) a complete to one of the requested operations requiring quiescing of I/O requests, the task manager 14 removes (at block 132) the operation information $18_i$, for the requested operation, including the operation ID $54_i$ and the subset of addresses $56_i$, for the completed operation from the quiesce information $16_j$ for the volume j including the subset of addresses subject to the quiesce. The operation information instance $18_i$ (FIG. 3) for the completed operation i may be removed (at block 134) from the operation information 18.

Figure 6:
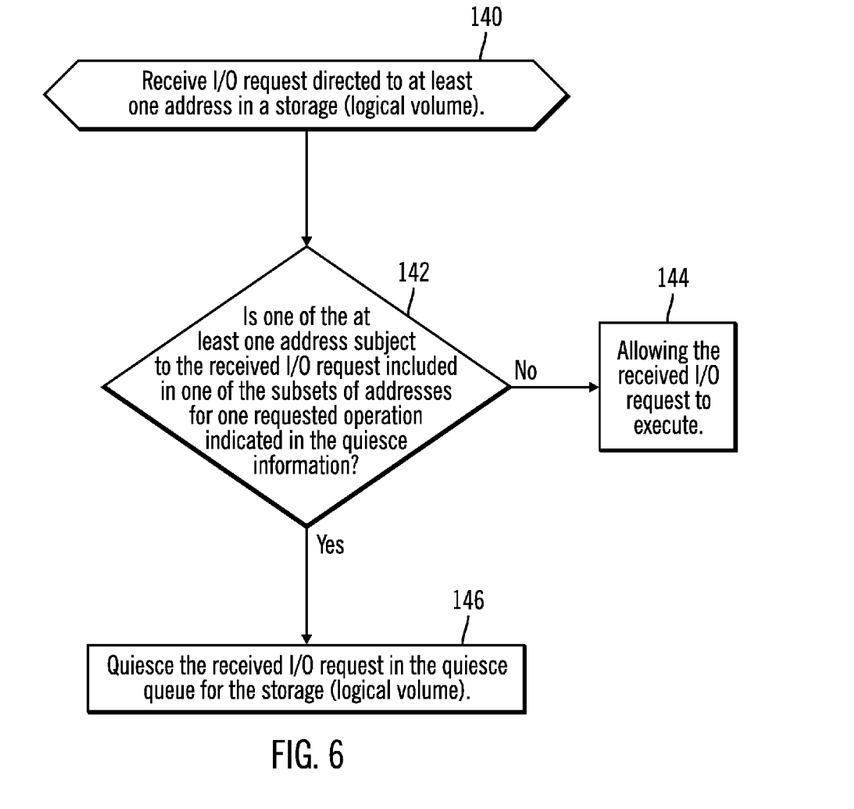
FIG. 6 illustrates an embodiment of operations to process a received I/O request.

FIG. 6 illustrates an embodiment of operations performed by the task manager 14 to process an I/O request directed to at least one address in one of the volumes 6. Upon receiving (at block 140) the I/O request, the task manager 14 determines (at block 142) whether one of the at least one address subject to the received I/O request is included in one of the subsets of addresses $56_1 \ldots 56_n$ for one requested operation indicated in the quiesce information $16_i$ for the volume i including the at least one address of the I/O request. If (from the no branch of block 142) the I/O request does not overlap with one of the subset of addresses $56_1 \ldots 56_n$ being quiesced, then the I/O request is allowed to execute (at block 154). However, if (from the yes branch of block 142) there is such overlap, then the task manager 14 quiesces (at block 146) the received I/O request in the quiesce queue 58 in the quiesce information 16i for the volume i.

Figure 7:
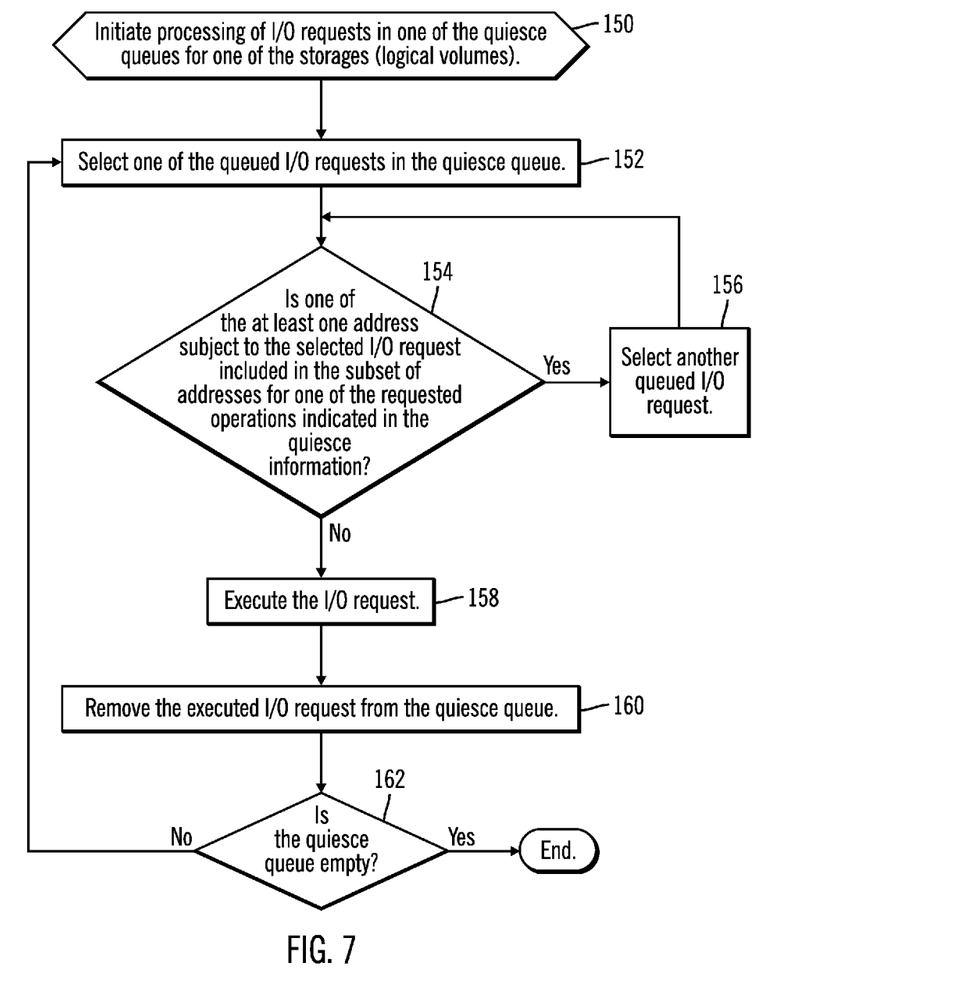
FIG. 7 illustrates an embodiment of operations to process queued I/O requests.

FIG. 7 illustrates an embodiment of operations performed by the task manager 14, or an I/O manager, to process I/O requests in one of the quiesce queues 58 for one of the volumes. The operations of FIG. 7 may be initiated (at block 150) for each of the quiesce queues 58 in the quiesce information $16_1 \ldots 16_n$ for each of the volumes $6_1 \ldots 6_n$. The task manager 14 selects (at block 152) one of the queued I/O requests in the quiesce queue 58 according to a queue ordering. The queue 58 may order I/O requests on a last-in-first-out (LIFO) basis or some other suitable queuing ordering scheme. A determination is made (at block 154) as to whether one of the at least one address subject to the selected I/O request is included in the subset of addresses $56_1 \ldots 56_n$ for one of the requested operations $54_1 \ldots 54_n$ indicated in the quiesce information $16_i$ for the volume i to which the I/O request is directed. If (from the yes branch of block 154) the I/O request overlaps one of the subset of address $56_1 \ldots 56_n$, then the task manager 14 selects (at block 156) another I/O request from the quiesce queue 58 to consider and proceeds back to block 154. If (from the no branch of block 154) the selected I/O request does not overlap one of the subset of address $56_1 \ldots 56_n$, then the task manager 14 executes (at block 158) the I/O request and removes (at block 160) the executed I/O request form the quiesce queue 58.

If (at block 162) the quiesce queue 58 is not empty, then control proceeds back to block 152 to select another I/O request from the quiesce queue 58. Otherwise, if (at block 162) the quiesce queue 58 is empty, control ends.

Figure 8:
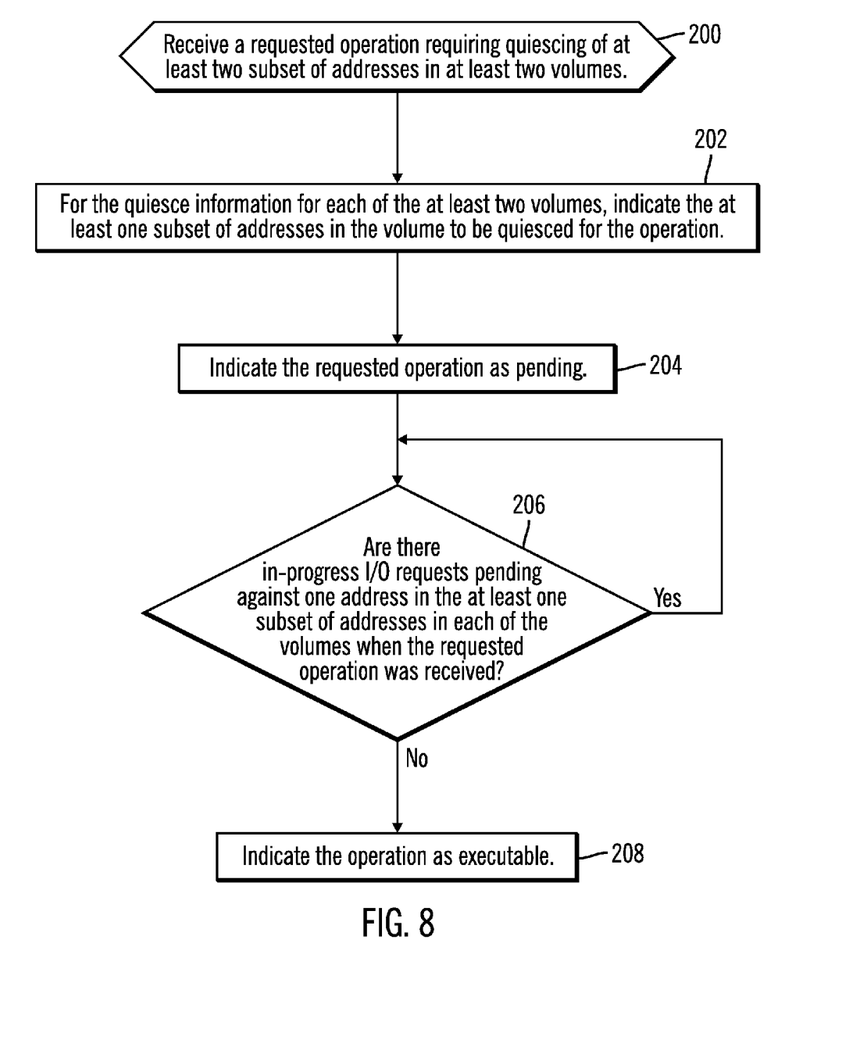
FIG. 8 illustrates an embodiment of operations to process a requested operation requiring quiescing of multiple subsets of addresses in multiple volumes.

FIG. 8 illustrates an embodiment of operations performed by the task manager 14 when the requested operation requires the quiescing of subsets of addresses in multiple volumes 6. One example of such an operation may comprise a PiT copy establish operation that requires quiescing of range of source addresses and target addresses involved in the PiT copy relationship, such that the PiT copy relationship can only be established after all I/O requests directed to the source and target addresses are quiesced. Upon receiving (at block 200) the requested operation requiring quiescing of I/O requests to at least two subsets of addresses in at least two volumes 6 in one or more of the storages 4, the task manager performs (at block 202) for each of the volumes 6 having the subsets, an operation to indicate each subset of addresses in the volume in field $56_n$ of the quiesce information for the volume being considered along with the operation ID in field $54_n$. The requested operation is indicated (at block 204) as pending. The task manager 14 then determines (at block 206) whether there are in-progress I/O requests pending against one address in the at least one subset of addresses $56_i$ in each of the volumes 6 when the requested operation was received. If (at block 206) there are such in-progress I/O requests pending against one of the subsets of addresses in the quiesce information 16 for any of the volumes 6, then control proceeds back to block 206 to continually perform the operation of block 206 until there are no more pending in-progress I/O request against one subset of addresses in any the volumes to quiesce for the requested operation. If (from the no branch of block 206) there are no pending in-progress I/O requests, then the task manager 14 indicates (at block 208) the requested operation as executable, such as by updating the operation information instance $18_i$ for the requested operation i to indicate executable in the operation executable flag 74 (FIG. 3).

Positive integer values, such as i, j, n, are used to represent a number of instances of an element, such as for the operation information instance, operation ID 54, subset of addresses 56, quiesce information 16, etc., and may represent a same or different positive integer value when used in different contexts.

Described embodiments provide techniques to quiesce I/O operations to a subset of addresses in a volume for a requested operation that requires the quiescing of I/O requests. With described embodiments, new I/O requests are quiesced to a quiesce queue. Further, all in-progress I/O requests toward the subsets of addresses the requested operation wants to quiesce, which were pending when the requested operation was received, are allowed to complete. After all in-progress I/O requests have completed, then the requested operation may be performed while I/O to the at least one subset of addresses in the at least one volume are quiesced until the requested operation completes. Further, a queued I/O request that was quiesced may not proceed if any address subject to the I/O request overlaps with one of the addresses in any of the subsets indicated in the quiesce information for any of the volumes.

Further, in certain embodiments, the described quiesce operations may be performed in the controller 2, without requiring support from the host system. Further, with described embodiments, I/O requests to addresses that do not overlap with subsets of addresses subject to quiescing in one or volumes may continue to run. In this way, quiescing of subsets of addresses in volumes does not cause delays in processing I/O requests that have no addresses overlapping with the addresses subject to quiescing.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing operations directed to a storage, wherein the computer program product comprises a tangible computer readable storage medium having computer readable program code embodied therein that executes to cause operations, the operations comprising:

receiving a requested operation to a subset of addresses in the storage that requires that Input/Output (I/O) requests to the subset of addresses received following the requested operation be quiesced;

indicating the subset of addresses in quiesce information;

quiescing I/O requests received following the receiving of the requested operation when one address subject to the I/O request is included in the subset of addresses;

determining whether there are in-progress I/O requests pending against the subset of addresses when the requested operation was received;

indicating the requested operation as executable in response to determining that there are no in-progress I/O requests against the subset of addresses; and executing one of the quiesced I/O requests in response to determining that no address subject to the quiesced I/O request is included in the subset of addresses indicated in the quiesce information.

2. The computer program product of claim 1, wherein the operations further comprise:

receiving an I/O request directed to at least one address in the storage;

determining whether one of the at least one address of the received I/O request is included in the subset of addresses indicated in the quiesce information; and quiescing the received I/O request in response to determining that one of the at least one address of the received I/O request is indicated in the subset of addresses indicated in the quiesce information.

3. The computer program product of claim 2, wherein the operations further comprise:

allowing the received I/O request to proceed in response to determining that there is no one of the at least one address of the received I/O request included in the subset of addresses in the quiesce information.

4. The computer program product of claim 1, wherein the operations further comprise:

repeatedly determining whether there is at least one in-progress I/O request against the subset of addresses, wherein the requested operation is indicated as executable in response to a first of the repeated determinations determining that there are no in-progress I/O requests against the subset of addresses.

5. The computer program product of claim 1, wherein the operations further comprise:

removing the indication of the subset of addresses for the requested operation in the quiesce information in response to completing the processing of the requested operation.

6. The computer program product of claim 5, wherein the quiesced I/O requests are stored in a queue, wherein the operations further comprise:

selecting one of the I/O requests in the queue; and determining whether one of the at least one address subject to the selected queued I/O request is included in the subset of addresses indicated in the quiesce information, wherein the executing of one of the queued I/O requests is performed in response to determining that one of the at least one address of the selected queued I/O request is not included in the subset of addresses.

7. The computer program product of claim 1, wherein the quiesce information indicates a plurality of subsets of addresses for different requested operations requiring the queuing of I/O requests that have not completed processing, wherein at least two of the subsets of addresses have at least one different address.

8. The computer program product of claim 7, wherein the operations further comprise:

removing the indication of one of the subsets of addresses for one of the requested operation indicated in the quiesce information in response to completing the processing of the requested operation directed to the subset of addresses;

receiving an I/O request directed to at least one address in the storage;

determining whether one of the at least one address subject to the received I/O request is included in one of the subsets of addresses indicated in the quiesce information; and queiscing the received I/O request in response to determining that one of the at least one address subject to the received I/O request is indicated in one of the subsets of addresses in the quiesce information.

9. The computer program product of claim 7, wherein there is one queue for quiesced I/O requests having at least one address included in one of the subsets of addresses for multiple pending requested operations requiring the quiescing of I/O requests, and wherein the selecting of one of the queued I/O requests is continually performed while the queue is non-empty.

10. The computer program product of claim 1, wherein the storage including the addresses comprises a logical volume in a storage system.

11. The computer program product of claim 1, wherein the subset of addresses comprises a first subset of addresses, wherein the quiesce information comprises first quiesce information, and wherein the storage comprises a first volume, wherein the requested operation requires to quiesce I/O operations for at least two subset of addresses, including the first subset of addresses, in at least two volumes, including the first volume, wherein the indicating the subset of addresses in the quiesce information comprises, indicating, for each of the volumes specified in the requested operation, the at least one subset of addresses indicated in the requested operation for the volume in an instance of the quiesce information, wherein the determining whether there are in-progress I/O requests pending when the requested operation was received comprises determining whether there are in-progress I/O requests pending against one address in the at least one subset of addresses in the quiesce information for each of the volumes when the requested operation was received, wherein the requested operation is indicated as executable in response to determining that there is no in-progress I/O request directed to one address in one of the at least one subset of addresses indicated in the quiesce information for each of the volumes, and wherein the executing of the I/O request is performed in response to determining that one of the at least one addresses subject to the quiesced I/O request is not included in the at least one subset of addresses indicated in the quiesce information for each of the volumes.

12. A system for processing operations directed to a storage, comprising:

a processor including hardware; and a tangible computer readable storage medium including computer code executed by the processor to perform operations, the operations comprising:

receiving a requested operation to a subset of addresses in the storage that requires that Input/Output (I/O) requests to the subset of addresses received following the requested operation be quiesced;

indicating the subset of addresses in quiesce information;

quiescing I/O requests received following the receiving of the requested operation when one address subject to the I/O request is included in the subset of addresses;

determining whether there are in-progress I/O requests pending against the subset of addresses when the requested operation was received;

indicating the requested operation as executable in response to determining that there are no in-progress I/O requests against the subset of addresses; and executing one of the quiesced I/O requests in response to determining that no address subject to the quiesced I/O request is included in the subset of addresses indicated in the quiesce information.

13. The system of claim 12, wherein the operations further comprise:

receiving an I/O request directed to at least one address in the storage;

determining whether one of the at least one address of the received I/O request is included in the subset of addresses indicated in the quiesce information; and quiescing the received I/O request in response to determining that one of the at least one address of the received I/O request is indicated in the subset of addresses indicated in the quiesce information.

14. The system of claim 13, wherein the operations further comprise:

allowing the received I/O request to proceed in response to determining that there is no one of the at least one address of the received I/O request included in the subset of addresses in the quiesce information.

15. The system of claim 12, wherein the operations further comprise:

repeatedly determining whether there is at least one in-progress I/O request against the subset of addresses, wherein the requested operation is indicated as executable in response to a first of the repeated determinations determining that there are no in-progress I/O requests against the subset of addresses.

16. The system of claim 12, wherein the quiesce information indicates a plurality of subsets of addresses for different requested operations requiring the queuing of I/O requests that have not completed processing, wherein at least two of the subsets of addresses have at least one different address.

17. The system of claim 16, wherein the operations further comprise:

removing the indication of one of the subsets of addresses for one of the requested operation indicated in the quiesce information in response to completing the processing of the requested operation directed to the subset of addresses;

receiving an I/O request directed to at least one address in the storage;

determining whether one of the at least one address subject to the received I/O request is included in one of the subsets of addresses indicated in the quiesce information; and quiescing the received I/O request in response to determining that one of the at least one address subject to the received I/O request is indicated in one of the subsets of addresses in the quiesce information.

18. The system of claim 12, wherein the subset of addresses comprises a first subset of addresses, wherein the quiesce information comprises first quiesce information, and wherein the storage comprises a first volume, wherein the requested operation requires to quiesce I/O operations for at least two subset of addresses, including the first subset of addresses, in at least two volumes, including the first volume, wherein the indicating the subset of addresses in the quiesce information comprises, indicating, for each of the volumes specified in the requested operation, the at least one subset of addresses indicated in the requested operation for the volume in an instance of the quiesce information, wherein the determining whether there are in-progress I/O requests pending when the requested operation was received comprises determining whether there are in-progress I/O requests pending against one address in the at least one subset of addresses in the quiesce information for each of the volumes when the requested operation was received, wherein the requested operation is indicated as executable in response to determining that there is no in-progress I/O request directed to one address in one of the at least one subset of addresses indicated in the quiesce information for each of the volumes, and wherein the executing of the I/O request is performed in response to determining that one of the at least one addresses subject to the quiesced I/O request is not included in the at least one subset of addresses indicated in the quiesce information for each of the volumes.

19. A method, comprising:

receiving a requested operation to a subset of addresses in a storage that requires that Input/Output (I/O) requests to the subset of addresses received following the requested operation be quiesced;

indicating the subset of addresses in quiesce information;

quiescing I/O requests received following the receiving of the requested operation when one address subject to the I/O request is included in the subset of addresses;

determining whether there are in-progress I/O requests pending against the subset of addresses when the requested operation was received;

indicating the requested operation as executable in response to determining that there are no in-progress I/O requests against the subset of addresses; and executing one of the quiesced I/O requests in response to determining that no address subject to the quiesced I/O request is included in the subset of addresses indicated in the quiesce information.

20. The method of claim 19, further comprising:

receiving an I/O request directed to at least one address in the storage;

determining whether one of the at least one address of the received I/O request is included in the subset of addresses indicated in the quiesce information; and quiescing the received I/O request in response to determining that one of the at least one address of the received I/O request is indicated in the subset of addresses indicated in the quiesce information.

21. The method of claim 20, further comprising:

allowing the received I/O request to proceed in response to determining that there is no one of the at least one address of the received I/O request included in the subset of addresses in the quiesce information.

22. The method of claim 19, further comprising:

repeatedly determining whether there is at least one in-progress I/O request against the subset of addresses, wherein the requested operation is indicated as executable in response to a first of the repeated determinations determining that there are no in-progress I/O requests against the subset of addresses.

23. The method of claim 19, wherein the quiesce information indicates a plurality of subsets of addresses for different requested operations requiring the queuing of I/O requests that have not completed processing, wherein at least two of the subsets of addresses have at least one different address.

24. The method of claim 23, further comprising:
removing the indication of one of the subsets of addresses for one of the requested operation indicated in the quiesce information in response to completing the processing of the requested operation directed to the subset of addresses;
receiving an I/O request directed to at least one address in the storage;
determining whether one of the at least one address subject to the received I/O request is included in one of the subsets of addresses indicated in the quiesce information; and
quiescing the received I/O request in response to determining that one of the at least one address subject to the received I/O request is indicated in one of the subsets of addresses in the quiesce information.

25. The method of claim 19, wherein the subset of addresses comprises a first subset of addresses, wherein the quiesce information comprises first quiesce information, and wherein the storage comprises a first volume, wherein the requested operation requires to quiesce I/O operations for at least two subset of addresses, including the first subset of addresses, in at least two volumes, including the first volume,
wherein the indicating the subset of addresses in the quiesce information comprises, indicating, for each of the volumes specified in the requested operation, the at least one subset of addresses indicated in the requested operation for the volume in an instance of the quiesce information,
wherein the determining whether there are in-progress I/O requests pending when the requested operation was received comprises determining whether there are in-progress I/O requests pending against one address in the at least one subset of addresses in the quiesce information for each of the volumes when the requested operation was received,
wherein the requested operation is indicated as executable in response to determining that there is no in-progress I/O request directed to one address in one of the at least one subset of addresses indicated in the quiesce information for each of the volumes, and
wherein the executing of the I/O request is performed in response to determining that one of the at least one addresses subject to the quiesced I/O request is not included in the at least one subset of addresses indicated in the quiesce information for each of the volumes.

* * * * *